United States Patent [19]

Henderson et al.

[11] Patent Number: 4,963,990
[45] Date of Patent: Oct. 16, 1990

[54] CONTINUOUS HALFTONING USING QUARTERNARY PIXEL CELLS

[75] Inventors: Thomas A. Henderson, Rochester; John F. Knapp, Fairport, both of N.Y.

[73] Assignee: Xerox Corporation, Stamford, Conn.

[21] Appl. No.: 363,838

[22] Filed: Jun. 9, 1989

[51] Int. Cl.$^5$ .............................................. H04N 1/23
[52] U.S. Cl. ..................................... 358/298; 358/458
[58] Field of Search ............... 358/298, 455, 456, 458, 358/300, 302; 346/108, 160

[56] References Cited

U.S. PATENT DOCUMENTS

| | | |
|---|---|---|
| 4,078,929 | 3/1978 | Gundlach . |
| 4,434,431 | 2/1984 | Ohkubo et al. . |
| 4,491,875 | 1/1985 | Kawamura .......................... 358/298 |
| 4,651,287 | 3/1987 | Tsao ..................................... 364/519 |
| 4,692,773 | 9/1987 | Saito et al. ............................ 346/1.1 |
| 4,714,964 | 12/1987 | Sasaki .................................. 358/298 |

*Primary Examiner*—Bruce A. Reynolds
*Assistant Examiner*—Scott A. Rogers
*Attorney, Agent, or Firm*—Ronald F. Chapuran

[57] ABSTRACT

A method of obtaining continuous tone reproductions in a raster scanned digital image having a given number of pixels for each halftone cell of the digital image and using four modulating levels for each pixel of the output scanner including a black and a white pixel level, the method comprising the steps of: choosing two reflectance gray levels intermediate the black and white levels to combine with the black and white pixel levels for providing quadruples, four numbers specifying the number of each kind of pixel in the halftone cell, for modulating the output scanner, determining a total number of average halftone cell gray levels to be available for the digital image, creating a list of quadruples that describe all possible average halftone cell grey levels available with the four modulating levels, and selecting a set of quadruplets from said list equal to a desired number of gray levels, said set of quadruplets selected to maximize the occurrence of black and white pixel levels in each halftone cell.

14 Claims, 5 Drawing Sheets

CONTINUOUS HALFTONING USING QUARTERNARY PIXEL CELLS

BACKGROUND OF THE INVENTION

The invention relates to electronic printers, and more particularly to an improved image halftoning system for printers.

Conventional xerographic copiers do not render faithful or pleasing copies of continuous tone originals. The usual discharge characteristic of the photoconductor and solid area developability of the xerographic development system combine to yield a Tone Reproduction Curve (TRC) with a steep slope and a narrow range. The result is a copy with washed out highlights and overdeveloped shadows. The standard technique used to improve the gray scale reproduction is to expose the photoconductor through a transmissive screen to produce a fine, spatially modulated voltage pattern on the photoconductor. Development of this modulated pattern yields a Tone Reproduction Curve with a lower slope and an extended range of input gray scale that produces a corresponding change in the output. The result is a more faithful and pleasing copy.

A similar effect is found in the halftoning process employed by xerographic based printers in digital printing of pictures. There the image is formed of a textured pattern of black and white spots, which gives the impression of a gray when viewed at normal reading distance. If the halftone frequency and number of distinguishable halftone steps are both sufficiently high, the printed picture will be pleasing to the eye. Halftone methods employed in binary xerographic printers have traditionally been binary, that is, the laser writes with only two laser intensity levels: on and off.

When assessing the quality of a binary xerographic printer, two measures are important: the halftone frequency (i.e. number of halftone cells per linear inch), and the number of distinguishable gray steps. To produce a copy of a picture with a just acceptable degree of halftone graininess requires at least 65 halftone cells per inch measured along a diagonal of the page. Good quality halftones require about 100 cells/inch, while high quality magazines typically use 150 cells/inch or higher. The needed number of distinct gray steps in the pictorial copy depends upon the eye's ability to distinguish closely spaced grays. A rule of thumb in the printing industry is that an acceptable picture should contain about 65 gray steps. For good quality, 100 or more steps are desired.

However, in a binary printer, the maximum number of output gray steps is limited to the number of pixels per halftone cell (p), plus 1. Thus for a typical 8 by 4 rectangular halftone cell, $p+1=33$ output gray steps. Higher halftone frequencies have fewer pixels per cell and therefore produce fewer gray steps. This is the fundamental limitation of binary printers.

In the prior art, U.S. Pat. No. 4,078,929 to Gundlach discloses a two-color system in which a three level charge pattern is produced, for example, by modulating a laser beam to permit selective image developing by two color developers using positively and negatively charged toner particles. And, Fundamentals of Digital Copiers (Canon, Oct. 1984), discusses halftone density processing in which black and white pixels are arranged in cells in different combinations to provide a series of gray level steps. Additionally, this publication describes a trinary coding system in which the individual cell pixels, in addition to being either all white or all black, can also be composed of one-half white and one-half black. Another U.S. Pat. No. 4,434,431 to Ohkubo et al, discloses a multi-level printer having a control circuit for controlling a laser diode to vary the intensity of the beam output by the laser in response to multi-level image signals, while U.S. Pat. No. 4,651,287 to Tsao, discloses a system in which either the dot size or dot intensity of a laser beam is controlled in accordance with a preset algorithm in order to improve print accuracy.

U.S. Pat. No. 4,714,964 to Sasaki discloses a method of using two or more kinds of sizes of dots and two or more coloring agents having different concentrations for reproducing of continuous tone for use on an Ink Jet printer. U.S. Pat. No. 4,692,773 to Saito et al. discloses an image forming method having different concentrations of ink and size to reproduce proper gradation level. U.S. Pat. No. 4,491,875 to Kawamura discloses a method of constituting micro pixels with luminosity that can be designated according to predetermined gradation.

In addition, U.S. Ser. No. 07/197,051 filed May 20, 1988 (now U.S. Pat. No. 4,868,587 issued Sep. 19, 1989) and assigned to the same assignee as the present invention, discloses a multilevel laser to expose pixels at more than one level of exposure including an array of halftone cells having a plurality of pixels, the pixels having either a white, black, or gray reflectance level, the ratio of pixels having the gray reflectance level to the pixels having the black reflectance level or the ratio of pixels having the gray reflectance level to the pixels having the white reflectance level in each of the cells being chosen to provide a substantially uniformly changing series of average reflectance levels ranging from white to black in the array of halftone cells.

It is known to use three or four alternatives rather than a simple binary designation to identify pixel grey levels as disclosed in the above pending U.S. patent application. For example, it is known to modulate a laser beam to provide a black pixel, a white pixel, and two intermediate grey levels. Such a system, however, often does not provide the maximum number of possible grey level cell averages for halftone reproductions. Often, also, only a select number of all possible grey level cells is needed for halftone reproductions discernible to the human eye. Therefore, in such systems, even if a large number of grey level averages are provided, such systems do not provide a reliable method to select the most appropriate number of possible cell grey level averages in the displayed or printed image. The difficulty is how to provide the maximum number of grey level averages for the reproduced image cells, as well as to be able to select the appropriate grey level averages to be used in the reproduction.

It is an object of the present invention, therefore, to provide an easy method to provide the maximum number of average grey level cells for reproducing an image. Another object of the present invention is to provide a simple and adaptable method for selecting a suitable set of cell grey level averages from a much larger population of grey level averages to enhance the halftone reproduction. Further advantages of the present invention will become apparent as the following description proceeds and the features characterizing the invention will be pointed out with particularity in the claims annexed to and forming a part of this specification.

SUMMARY OF THE INVENTION

Briefly, the present invention is a method of obtaining continuous tone reproductions in a raster scanned digital image having a given number of pixels for each halftone cell of the digital image and using four modulating levels for each pixel of an output scanner including a black and a white pixel level, the method comprising the steps of choosing two reflectance gray levels intermediate the black and white levels to combine with the black and white pixel levels for providing quadruples for modulating the output scanner, determining a total number of average halftone cell gray levels to be available for the digital image, creating a list of quadruples that describe all possible average halftone cell grey levels available with the four modulating levels, and selecting a set of quadruples from said list equal to said total number of average halftone cell gray levels, said set of quadruples selected to maximize the occurrence of black and white pixel levels in each halftone cell.

IN THE DRAWINGS

For a better understanding of the present invention, reference may be had to the accompanying drawings wherein the same reference numerals have been applied to like parts and wherein.

DETAILED DESCRIPTION OF THE INVENTION

Figure 1:
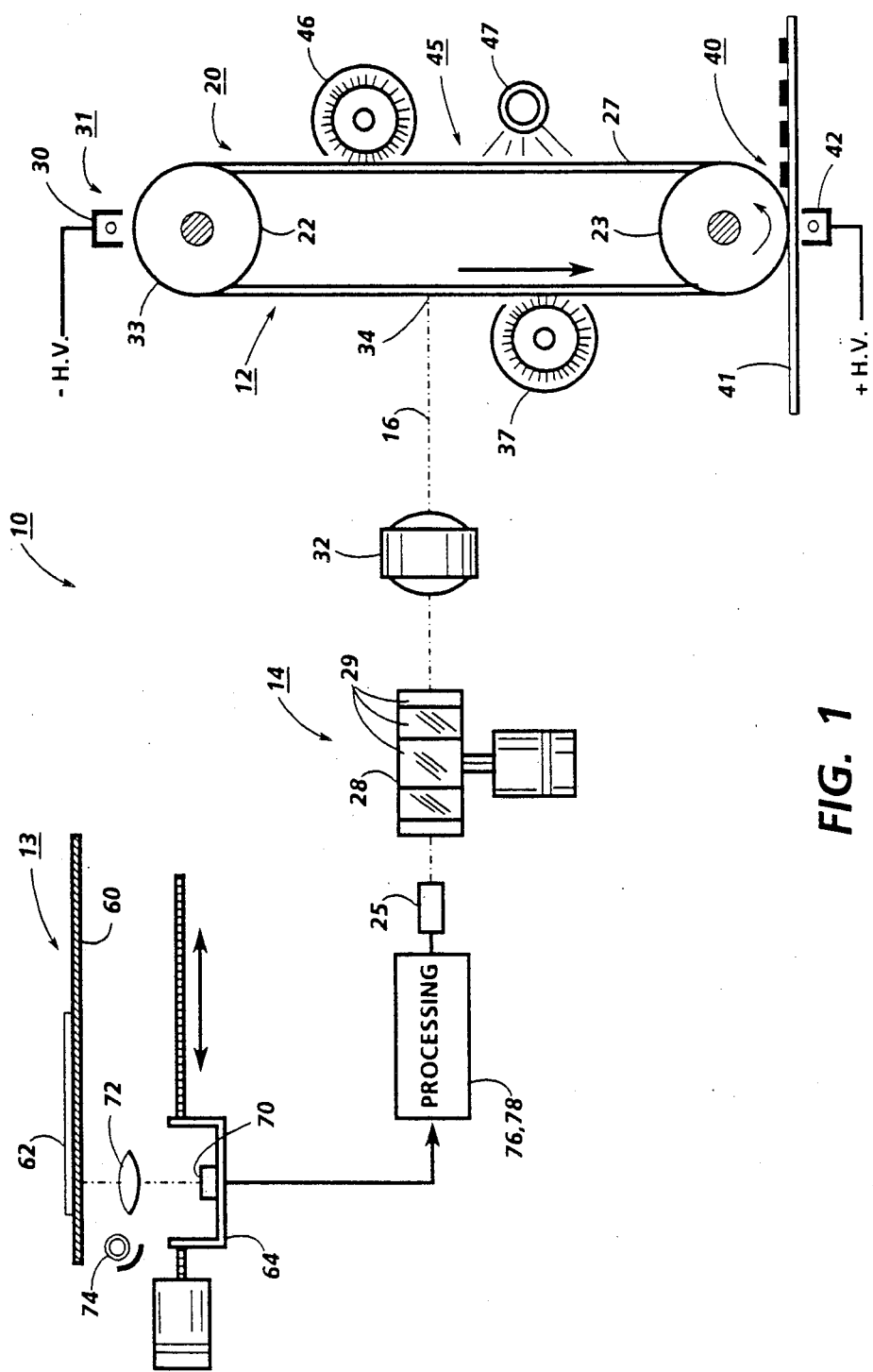
FIG. 1 is a schematic view of a printer incorporating the quaternary system of the present invention for halftone printing.
Figure 2:
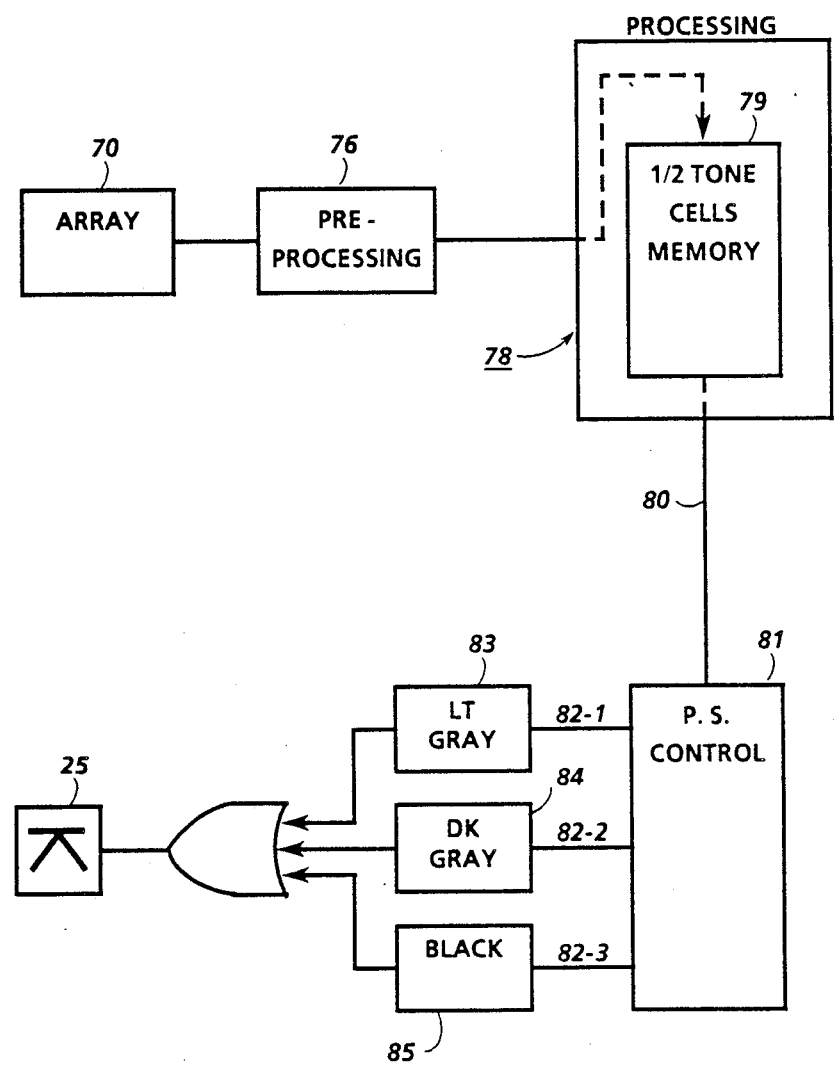
FIG. 2 is a block diagram illustrating the image processing and halftone generating components used with the printer shown in FIG. 1.

Referring particularly to FIGS. 1 and 2 of the drawings, there is shown an exemplary electronic printer 10 incorporating the quaternary halftone system of the present invention. Printer 10 includes a xerographic processing section 12, a document scanning section 13, and an image printing section 14, the latter including a variable intensity imaging beam of light 16 for scanning across photoreceptor 20 of xerographic section 12 to provide four level exposure for printing as will appear herein.

Xerographic processing section 12 includes a photoreceptor 20 illustrated herein in the form of an endless belt stretched across drive and idler belt support rollers 22, 23 respectively on which latent electrostatic images representative of the image signal input are created. Belt supporting rollers 22, 23 are rotatably mounted in predetermined fixed position by suitable means (not shown). Roller 23 is driven from a suitable drive motor (not shown) to move photoreceptor 20 in the direction shown by the solid line arrow. While photoreceptor 20 is illustrated in the form of an endless belt, other photoreceptor configurations such as a drum may be envisioned.

Photoreceptor 20 comprises an inner layer or substrate of a suitable flexible electrically conductive substrate with an outer photoconductive layer 27 such as selenium thereupon. Photoreceptor 20 may be opaque, that is, impervious to light or wholly or partially transparent. The exemplary photoreceptor 20 typically has an aluminum substrate which renders the photoreceptor opaque. However, other substrate materials such as glass, may be contemplated which would render photoreceptor 20 wholly or partially transparent. Photoreceptor materials other than selenium as, for example, organic, may also be contemplated. One organic type material, for example, consists of an aluminized Mylar substrate having a layer of selenium dispersed in poly-N-vinyl carbazole with a transparent polymer overcoating containing a charge transport compound such as pyrene.

A corona charging device 30 commonly known as a corotron is operatively disposed adjacent photoreceptor 20 at charging station 31. Corotron 30 which is coupled to a suitable negative high voltage source ($-Hv$) serves to place a uniform negative charge on photoreceptor 20 in preparation for imaging.

Imaging beam 16 of image printing section 14 is incident on photoreceptor 20 at exposure point 34. Imaging beam 16 is derived from laser 25, the intensity of beam 16 being at one of three possible levels in the quaternary system described. Beam 16 is swept across photoreceptor 20 by a rotating polygon 28. A suitable lens 32 focuses beam 16 onto photoreceptor 20.

A development subsystem 37 exemplified herein by a magnetic brush roll, is disposed in operative contact with photoreceptor 20 downstream of the contact point 34 of imaging beam 16. Development subsystem 37 includes a suitable developer housing (not shown) within which a supply of developer is provided together with means for loading the developer onto the development subsystem's magnetic brush roll.

The development subsystem preferably comprises a non-scavenging development system using a mono-component developer, the mono-component developer being a relatively small colorant material (referred to as toner). Due to electrostatic forces, the toner is drawn to the latent electrostatic image formed on photoreceptor 20 by imaging beam 16 in proportion to the latent image charge level to develop the image. In the present arrangement, a discharge development system is used wherein, following negative charging of photoreceptor 20 by corotron 30, image areas are discharged by beam 16 in accordance with image signals. The developing toner is negatively charged and is therefore attracted to the discharged image areas while being repelled from the un-discharged areas.

As will be understood, in the development subsystem of this type, when the intensity of beam 16 is at a maximum, maximum development occurs and a black pixel is obtained. When beam 16 is turned off, no development occurs and a white pixel is obtained. In the quaternary system described, two intermediate gray pixel levels are required. These are obtained by providing two intermediate beam intensity levels so that corresponding intermediate amounts of development take place to provide predetermined light gray and dark gray pixels respectively.

Following development of the latent electrostatic image on photoreceptor 20 by developing subsystem 37, the developed image is transferred to a suitable copy or print substrate material 41 such as paper at transfer station 40. To facilitate transfer, a transfer corotron 42 which is coupled to a high voltage power source (+Hv) is provided to attract the developed image on photoreceptor 20 to copy substrate material 41. Following transfer, the developed image is fixed by fusing. Any residual charges and/or developing material left on photoreceptor 20 are removed at cleaning station 45 by erase lamp 47 and cleaning brush 46 respectively.

At document scanning section 13 of printer 10, image data in the form of electrical signals representative of the document reflectance are generated. In the exemplary arrangement shown, document scanning section 13 includes a transparent platen 60 on which a document 62 bearing the image to be processed and printed is placed, either manually or by means of an automatic document handler (not shown). A suitable carriage 64, supported for reciprocating back and forth movement below platen 60, has one or more linear scanning arrays, identified as array 70, mounted thereon. Array 70 may comprise any suitable scanning array type as, for example, a CCD. Carriage 64 is driven by a suitable reversible driver such as a step motor (not shown). Suitable optics, exemplified here by lens 72, focuses array 70 on a line of the image on document 62. A suitable lamp 74 illuminates the document line being scanned by array 70. Array 70 converts each line of the document image viewed into a succession of analog image signals. The image signals are output to a video pre-processing section 76 where the signals are converted from analog to multi-bit digital image picture elements or pixels representing the document reflectance levels.

It is assumed that pre-processing section 76 will output one image pixel for each of the smallest printable units on the output page. The output value from section 76 is then used as an index into a table of halftone cells as in processing section 78. Each image pixel from section 76 then, points independently to the halftone cell that has been pre-selected to render that image density on the output print. The pixel in that cell that is ultimately fed to line 80 is chosen based on a count of the number of pixel and scan lines that have already been processed. So, if a large area of input image is at a constant value, the printed result is a regular array of halftone dots. If however, the input image has detail on a scale smaller than the halftone cell size, the actual shape of the printed halftone dot will adapt in such a way as to render the image detail more faithfully. This is a technique that has come to be known as partial dotting.

In the quaternary system described, each halftone cell selected is made up of various combinations of pixels having one of four possible reflectance levels. Processing section 78 outputs to line 80, on a pixel by pixel line by line basis, multi-bit control signals representative of the halftone cells to be printed to power supply control 81. Control 81 responds to the control signal inputs by providing power actuating signals to lines 82-1, 82-2, 82-3 that selectively actuate power supplies 83, 84, 85 respectively.

Power supplies 83, 84, 85 each provide different levels of power output for driving laser 25 to expose photoreceptor 20 and provide a latent electrostatic image in accordance with the image content of the image signal output of array 70. In the quaternary system disclosed, power supply 83 provides a first level power input to laser 25 to cause laser 25 to output a beam 16 at a first intensity level corresponding to light gray. Power supply 84 provides a second level power input to laser 25 to cause laser 25 to output a beam 16 at a second intensity level corresponding to dark gray. And, power supply 85 provides a third level power input to laser 25 to cause laser 25 to output a beam 16 at a third intensity level corresponding to black. It will be understood that exposure at the remaining fourth level, i.e. white, in the quaternary system disclosed herein is accomplished through the absence of a control signal to power supplies 83, 84, 85. In that event, diode 25 does not expose photoreceptor 20 so that the charge remaining on photoreceptor 20 at the point of development is insufficient to cause developing by developer 37. As will appear, the halftone cells held in memory 79 of processing section 78 are chosen to provide a series of average gray reflectances which give enhanced image reproduction. While separate power supplies 83, 84, 85 are shown, it will be understood that any suitable source of power for operating laser 25 at the various intensity levels described may be used.

One of the central tradeoffs in conventional binary digital imaging is between halftone screen frequency and the number of halftone grays that can be reproduced. It is desirable to print with a high screen frequency so that the individual dots of the screen appear as a uniform gray. At high screen frequencies, however, the number of available halftone grays is reduced and smooth density transitions appear quantized and show density contours.

These problems with binary halftones can be significantly relieved if pixels can be printed at levels of gray, as well as black and white. The average reflectances of halftone cells composed of multi-level pixels is described in the following equations. for any halftone cell, let:

$a_i$ = number of pixels in the cell at level i
$g_i$ = reflectance of gray level i
n = number of pixels in the halftone cell
l = number of levels per pixel The average reflectance for any cell is:

$$R = \left( \sum_{i=1}^{l} a_i g_i \right) / n$$

But since there will always be n pixels in the cell and since there can be no less than 0 and no more than n pixels at any level l, there are the following constrainsts on $a_i$.

$$\sum_{i=1}^{l} a_i = n, \; 0 < a_i < n$$

The maximum number of cell reflectances R is the number of ways the $a_i$ can sum to n # of $R = (n+l-1)!/n!(l-1)!$

To illustrate the meaning of these equations, assume that l equals 4. This is the next logical step beyond binary printing because now each pixel is represented by two bits of digital information instead of one. Assume also that each halftone cell is composed of 16 pixels. In binary printing, each cell then has 17 levels of gray but in "quaternary" printing, the cells have the potential for 969 unique gray tones.

Figure 3:
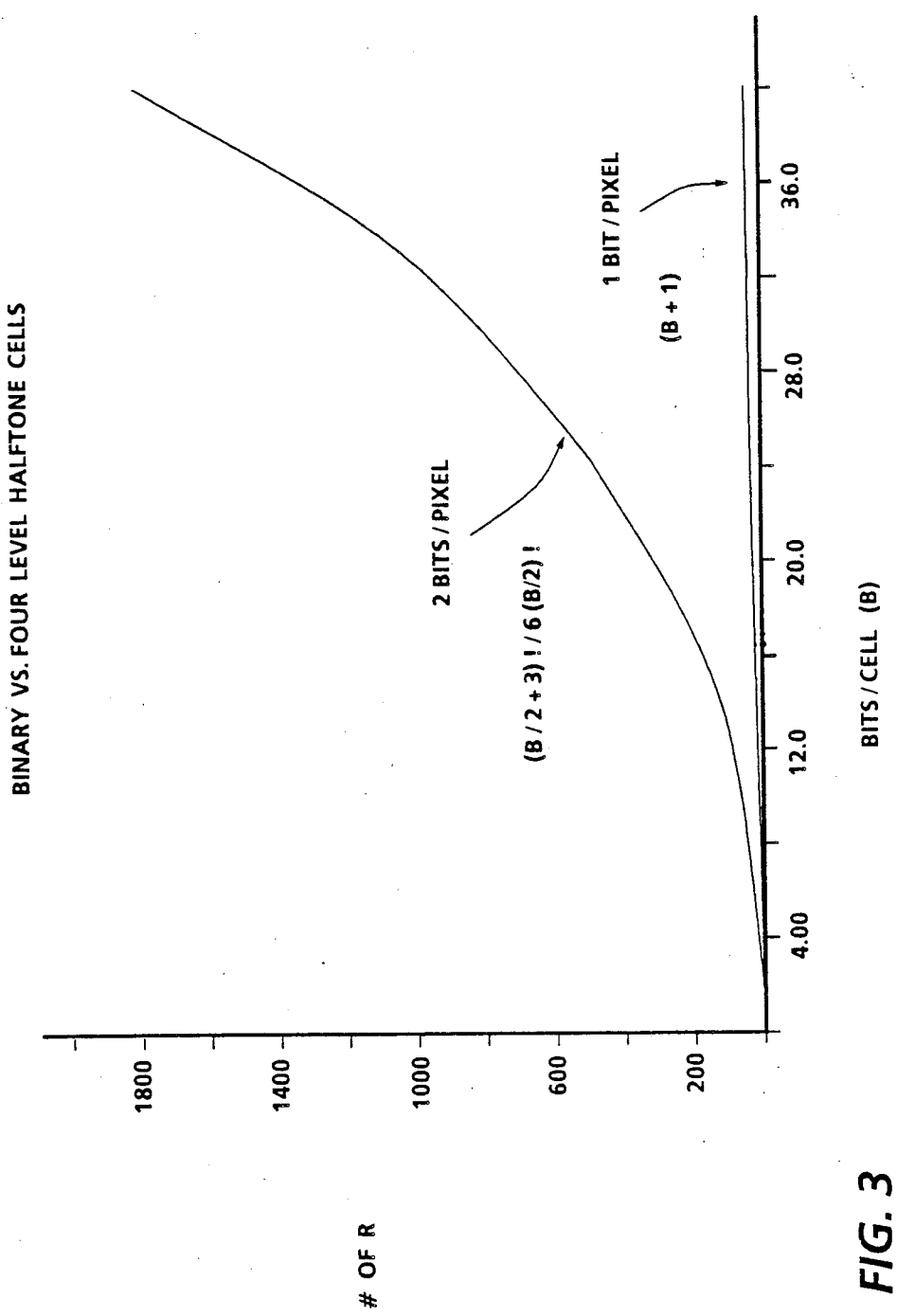
FIG. 3 illustrates the number of average halftone grey levels as a function of bits per pixel.

To examine the meaning more generally, FIG. 3 compares the total number of grays in quaternary halftone cells to binary halftones as a function of the number of bits per halftone cell in the digital representation. The number of grays is linear with the number of binary pixels in a cell but grows as a factorial for quaternary pixel cells. This means that gray pixel halftones are vastly more efficient in the digital encoding of gray tone information.

In accordance with the present invention, a method for choosing quaternary pixel halftone cells for digital imaging is defined. There are two issues to be addressed in this choice; the reflectance values to be used for the intermediate grays and the construction of cells that show crisply defined halftone dots.

Figure 4:
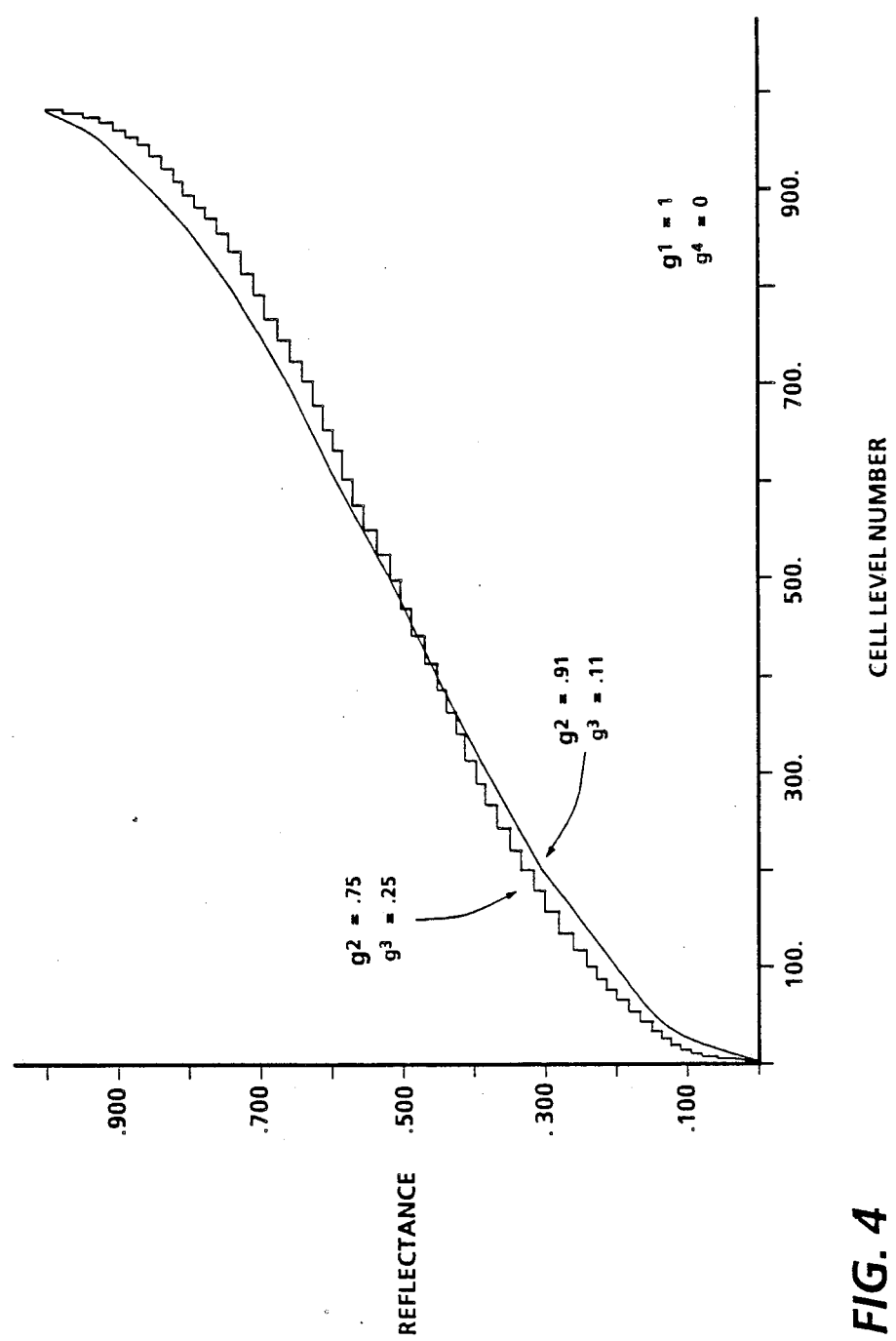
FIG. 4 illustrates the number of average halftone grey levels as a function of choice of discrete grey level modulation level.

As the equation for the total number of reflectances shows, the maximum number of reflectances can only be achieved if the pixel gray levels $g_i$ are chosen properly. In general, the levels must not in any way be integer multiples of each other. FIG. 4 shows the more specific case for quaternary pixels. In one curve, the pixel levels are white, black and two intermediate reflectances of 0.25 and 0.75. The second curve with intermediate levels of 0.11 and 0.91 clearly shows the greater number of distinct halftone gray levels that are achieved through proper choice of pixel reflectance levels.

The equations also show that the total possible number of cell reflectances in quaternary pixel cells can become very large. The number available soon exceeds that discernable by the human visual system. Furthermore, many of the available quaternary pixels cells will not produce crisply defined halftone dots. In accordance with the present invention, therefore, there can be constructed cells that maintain well defined halftone dots to suppress the noise inherent in most digital printing systems, particularly in laser ROS xerography.

To achieve this result, the quaternary pixel halftone cells are chosen according to a criterion that minimizes the use of gray pixels within the constraint of the desired number of levels. This principle, along with a cell filling order to be described, confines the function of gray pixels to modulating the edges of the halftone dot. The selection of quaternary pixel cells for imaging proceeds as follows:

Given the number of pixels per halftone cell, create a list of the quadruples $a_i$ that describe all possible halftone cells.

Examine each quadruple and compare the number of gray pixels in the cell to the number of white or black pixels in the cell.

Some combinations or gray level averages are better than others. In general, in a quaternary system, the best results are achieved with average gray levels that maximize the use of the black and white gray scale levels and minimize the use of the intermediate gray levels. There is no set procedure to select the most favorable set of quadruples, since the most favorable set may depend upon the inherent characteristics of a particular scanning system. One particular procedure is the following:

Step 1: If there are more white pixels than black pixels, reject quadruples where the total number of gray pixels is greater than some fraction of the number of white pixels.

Step 2: If there are more black pixels than white pixels, or if there are an equal number of each, reject quadruples where the total number of gray pixels is greater than some fraction of the number of black pixels.

Figure 5:
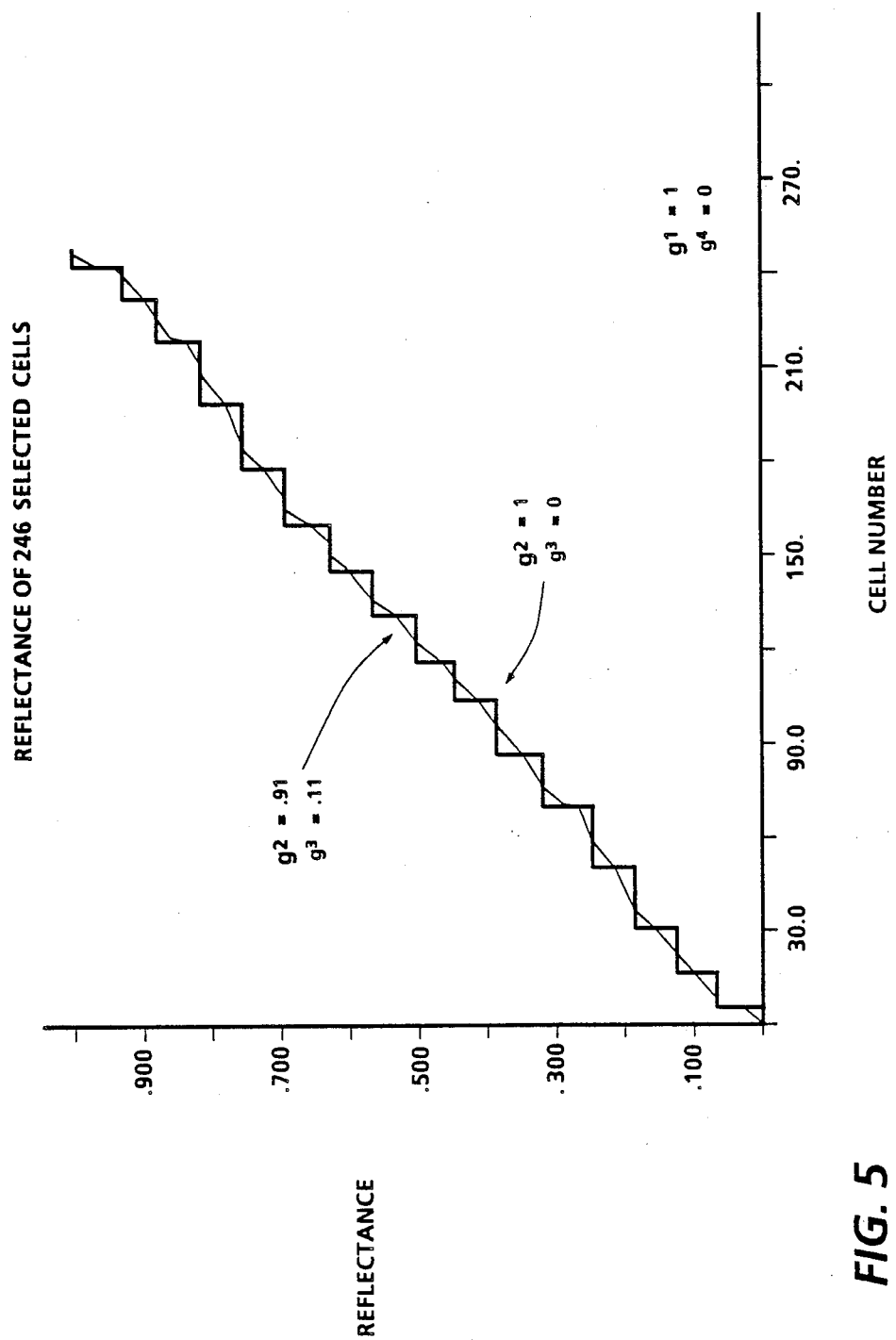
FIG. 5 illustrates a tone reproduction curve produced in accordance with the present invention.

Adjust the value of the fraction in Step 1 and 2 so that the number of remaining cells is close to the number of cells desired for imaging FIG. 5 shows the tone reproduction curve produced when the original 969 halftones from a 16 pixel cell are reduced to 246 by the process outlined above. Also shown are the reflectances that result from the equivalent binary pixel cell. The step curve is computed with a degenerate setting of gray levels, that is, with a normally dark gray pixel level set to black and a normally light gray pixel level set to white. The more continuous curve results from one intermediate level at light gray and the other at dark gray.

Once some set of quadruples $a_i$ are selected, the actual pixel patterns in the halftone cells can be constructed. The principle involved is to grow a dot from some origin and to keep the dot growth as much compact and symmetrical about that origin as possible. In addition, for whatever filling order is chosen, the cell will be filled first with black pixels, then with dark gray pixels, the with light gray pixels and what remains is, of course, white.

As an example, assume again that there are 16 pixels in a cell. In accordance with the present invention, the cell could be filled as follows:

| 16 | 7 | 11 | 15 |
| 12 | 2 | 1  | 6  |
| 8  | 4 | 3  | 10 |
| 13 | 9 | 5  | 14 |

So that, for example, if the quadruple $a_i$ has 5 black pixels, 3 dark gray and 1 light gray, the cell would be filled as:

| xx | G1 | xx | xx |
| xx | B  | B  | G1 |
| G1 | B  | B  | xx |
| xx | G2 | B  | xx |

Thus with the methods outlined above, a halftone scheme using quaternary pixels can be created. The new halftones will provide a great many more gray tones but will not require a decrease in screen frequency from that used in conventional binary printing.

As is known, the tone reproduction curve transforms image input densities to new values that compensate for printer characteristics. In binary printers, the printer characteristics are fixed by the structure of the halftone cells employed. As discussed, the use of gray pixel halftone cells greatly expands the gamut of gray tones over that available with binary pixels. In addition, gray pixel halftone cells give new opportunities for control of printer characteristics through variation of the reflectance level of the gray pixels. The choice of gray pixel reflectances is critical to obtain the maximum number of unique halftone cell reflectances, the guiding principle as stated being that the level choices should in no way be integer multiples of each other. The choice of reflectance for quaternary pixels consisted of full black, full white, very light gray and very dark gray. In this scheme, the theoretical halftone cell reflectances are roughly linear with cell index.

FIG. 4 shows the effect of different choices for the intermediate pixel levels. In each curve, the black and white levels have remained constant while the gray pixel values are varied. As is evident in FIG. 3, choosing two light grays for the intermediate pixel levels produces many more cells with lighter gray tones. Conversely, the choice of dark intermediate levels provides many more dark halftone levels. The next effect of this is to alter the relationship between cell index and the associated reflectance, that is, to alter the tone reproduction curve. In these curves, levels were carefully chosen so that no duplicate halftone cell reflectances are produced.

To summarize, the use of gray pixel halftone cells provides unique opportunities for control of printer characteristics. Gray level settings can be used to alter the distribution of cells over all printable reflectances, emphasizing lighter or darker tones depending on the choice of intermediate levels. This fact could be used to better render different types of images depending on the distribution of grays in the original or to compensate for changes in printer hardware characteristics over time. Also, choice of pixel gray levels can deliberately introduce contours into an image, which may be useful in some specialized applications.

While the invention has been described with reference to the structure disclosed, it is not confined to the details set forth, but is intended to cover such modifications or changes as may come within the scope of the following claims.

We claim:

1. A method of obtaining continuous tone reproductions of a raster scanned digital image having a given number of pixels for each halftone cell of the digital image using four output scanner modulating tone levels for each pixel including a black and a white level comprising the steps of:
    choosing two reflectance gray pixel levels intermediate to the black and white levels to combine with the black and white pixel levels for providing quadruplets, four numbers specifying the total number of pixels in each halftone cell, corresponding to each of the four tone levels, for modulating the output scanner.
    determining a total number of average halftone cell gray levels to be available for the digital image,
    creating a list of quadruplets that describe all possible average halftone cell grey levels available with the four modulating tone levels, and
    selecting a set of quadruplets from said list equal to a desired number of all gray levels, and set of quadruplets selected to maximize the occurrence of black and white pixel levels in each halftone cell.

2. The method of claim 1 including the step of constructing pixel relationships within each halftone cell for each quadruplet to a pre-determined pattern.

3. The method of claim 2 wherein the two reflectance gray pixel levels intermediate to the black and white pixel levels are a relatively dark gray level and a relatively light grey level and constructing the pre-determined pattern includes the steps of filling the halftone cell from the center outward in the order of black, dark gray, light gray, and white.

4. The method of claim 3 wherein the placement of pixels for a 16 pixel cell is:

| 16 | 7 | 11 | 15 |
| --- | --- | --- | --- |
| 12 | 2 | 1 | 5 |
| 8 | 4 | 3 | 10 |
| 13 | 9 | 5 | 14 | wherein the first pixel is placed in slot 1, the second pixel in slot 2, and the last pixel in slot 16.

5. The method of claim 1 wherein the step of choosing two reflectance gray pixel levels intermediate to the black and white levels includes the step of choosing 2 gray pixel levels that are not integer multiples of one another.

6. The method of claim 1 wherein the step of choosing two reflectance gray pixel levels intermediate the black and white pixel levels includes the step of choosing 2 gray pixel levels to maximize the total number of average halftone cell gray levels available.

7. The method of claim 1 wherein the two reflectance gray pixel levels intermediate to the black and white levels are a relatively dark gray pixel level and a relatively light grey level.

8. The method of claim 1 wherein the step of choosing two reflectance gray pixel levels intermediate the black and white levels includes the step of reselecting two reflectance gray levels in response to inherent gradation differences to maximize gray level reproducibility.

9. In a printing system for producing continuous tone reproductions of a raster scanned digital image having a given number of pixels for each halftone cell of the digital image using four output scanner modulating tone levels for each pixel, the method of changing the printer output gray level characteristics comprising the steps:
    initially choosing a first reflectance gray pixel level intermediate black and white reflectance levels for modulating the output scanner to provide a first range of average halftone cell levels,
    determining the need of a second range of average halftone cell levels,
    selecting a second reflectance gray pixel level intermediate the black and white reflectance levels, and
    replacing the first reflectance gray pixel level with the second reflectance gray pixel in order to provide a second range of average halftone cell levels.

10. The method of claim 9 wherein the step of selecting a second reflectance gray pixel level intermediate black and white reflectance levels includes the step of selecting the second reflectance gray pixel level to emphasize lighter tones in the scanned digital images.

11. The method of claim 9 wherein the step of selecting a second reflectance gray level intermediate black and white reflectance levels includes the step of selecting the second reflectance gray level to emphasize darker tones in the scanned digital images.

12. A method of obtaining continuous tone reproductions of a halftone cell of the digital image using more than two output scanner modulating tone levels for each pixel including a black and a white level comprising the steps of:
    choosing a reflectance gray pixel level intermediate the black and white levels to combine with the black and white pixel levels for providing at least three choices for modulating the output scanner,
    determining a total number of average halftone cell gray levels to be available for the digital image.

creating a list of identifiers that describe all possible average halftone cell grey levels available with the modulating choices, and selecting a set of identifiers from said list, said set of identifiers selected to maximize the occurrence of black and white pixel levels in each halftone cell.

13. The method of claim 12 wherein each identifier comprises a set of numbers, each number representing the number of pixels in a halftone cell corresponding to one of the modulation choices.

14. The method of claim 13 including the step of constructing pixel relationships within each halftone cell for each identifier according to a pre-determined pattern.

* * * * *